United States Patent
Smith et al.

(10) Patent No.: US 8,621,632 B1
(45) Date of Patent: Dec. 31, 2013

(54) SYSTEMS AND METHODS FOR LOCATING MALWARE

(75) Inventors: Spencer Smith, El Segundo, CA (US); Adam Glick, Culver City, CA (US); Nicholas Graf, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 1046 days.

(21) Appl. No.: 12/470,312

(22) Filed: May 21, 2009

(51) Int. Cl.
*H04L 29/06* (2006.01)

(52) U.S. Cl.
USPC .................. 726/24; 726/22; 726/23

(58) Field of Classification Search
USPC ...................................... 726/22–24
See application file for complete search history.

(56) References Cited

U.S. PATENT DOCUMENTS

| | | | | |
|---|---|---|---|---|
| 7,854,006 | B1 * | 12/2010 | Andruss et al. | 726/24 |
| 2003/0088680 | A1 * | 5/2003 | Nachenberg et al. | 709/229 |
| 2005/0039029 | A1 * | 2/2005 | Shipp | 713/188 |
| 2005/0240999 | A1 * | 10/2005 | Rubin et al. | 726/22 |
| 2006/0010495 | A1 * | 1/2006 | Cohen et al. | 726/24 |
| 2007/0028303 | A1 * | 2/2007 | Brennan | 726/24 |
| 2007/0028304 | A1 * | 2/2007 | Brennan | 726/24 |
| 2009/0328221 | A1 * | 12/2009 | Blumfield et al. | 726/24 |

OTHER PUBLICATIONS

Li et al., AGIS: Towards Automatic Generation of Infection Signatures, Jun. 2008, Retrieved from http://ieeexplore.ieee.org/stamp/stamp.jsp?tp=&arnumber=4630092, pp. 237-246.*

Oscar Gonzalez, Identifying and Analyzing Spyware Incursion from Internet Surfing, May 2005, Retrieved http://www.tech.uh.edu/cae-dc/documents/Oscar-Gonzales_2005.pdf, pp. 1-89.*

* cited by examiner

*Primary Examiner* — Chau Le

(74) *Attorney, Agent, or Firm* — ALG Intellectual Property, LLC

(57) ABSTRACT

A computer-implemented method for locating malware may include identifying a malicious behavior in a computing system. The computer-implemented method may also include determining that the malicious behavior arises from a set of interrelated executable objects. The computer-implemented method may further include identifying an executable object recently added to the set of interrelated executable objects. The computer-implemented method may additionally include attributing the malicious behavior to the recently added executable object based on when the recently added executable object was added to the set of interrelated executable objects. The computer-implemented method may also include performing a security action on the recently added executable object. Various other methods, systems, and computer-readable media are also disclosed.

18 Claims, 7 Drawing Sheets

US 8,621,632 B1

SYSTEMS AND METHODS FOR LOCATING MALWARE

BACKGROUND

Consumers and businesses face a growing tide of malicious software that threatens the stability and performance of their computers and the security of their data. Computer programmers with malicious motivations have created and continue to create viruses, Trojan horses, worms and other programs to compromise computer systems. These malicious programs are often referred to as malware. In an attempt to evade detection, malicious programmers may inject malware into or among legitimate programs.

Security software companies are combating malware by creating and deploying malware signatures (e.g., hash functions that identify malware) to their customers on a regular basis. However, a significant amount of malware has not yet been identified and therefore cannot be detected using traditional signature-based malware detection.

In addition to or instead of signature-based detection, security software companies may attempt to detect malware through behavioral analysis. In behavioral-analysis technologies, security software may monitor a computer system for malicious behavior. For example, the security software may determine that a certain process (i.e., a running computer program) is responsible for a detected malicious behavior. However, a process may include executable code from more than one file. Accordingly, behavioral-analysis technologies alone may not sufficiently pinpoint a file infected with malware.

SUMMARY

As will be described in greater detail below, the instant disclosure generally relates to systems and methods for locating malware. For example, a conviction module may identify a malicious behavior in a computing system and determine that the malicious behavior arises from a set of interrelated executable objects. The set of interrelated executable objects may include, for example, an executable program and dynamically linked libraries and/or plug-ins associated with the executable program. A monitoring module may identify an executable object recently added to the set of interrelated executable objects (e.g., a recently installed plug-in). An attribution module may attribute the malicious behavior to the recently added executable object based on when the recently added executable object was added to the set of interrelated executable objects (e.g., the recently added executable object may have been added shortly before the malicious behavior arose). A remediation module may then perform a security action on the recently added executable object. For example, the remediation module may remove the recently added executable object.

In some embodiments, the attribution module may attribute the malicious behavior to the recently added executable object by determining that the recently added executable object was added to the set of interrelated executable objects within a predetermined window of time. Additionally or alternatively, the attribution module may attribute the malicious behavior to the recently added executable object by determining that the recently added executable object was one of the most recent executable objects to be added to the set of interrelated executable objects. According to various embodiments, the attribution module may attribute the malicious behavior to the recently added executable object by determining that the recently added executable object was one of the most recent executable objects to be added to the set of interrelated executable objects within a predetermined window of time.

In some embodiments, the monitoring module may track the addition of executable objects. For example, the monitoring module may create an entry in a database each time an executable object is added to the set of interrelated executable objects. The database entries may include the identity of the added executable object, the load point where the executable object was added, and/or a time that the executable object was added to the set of interrelated objects.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
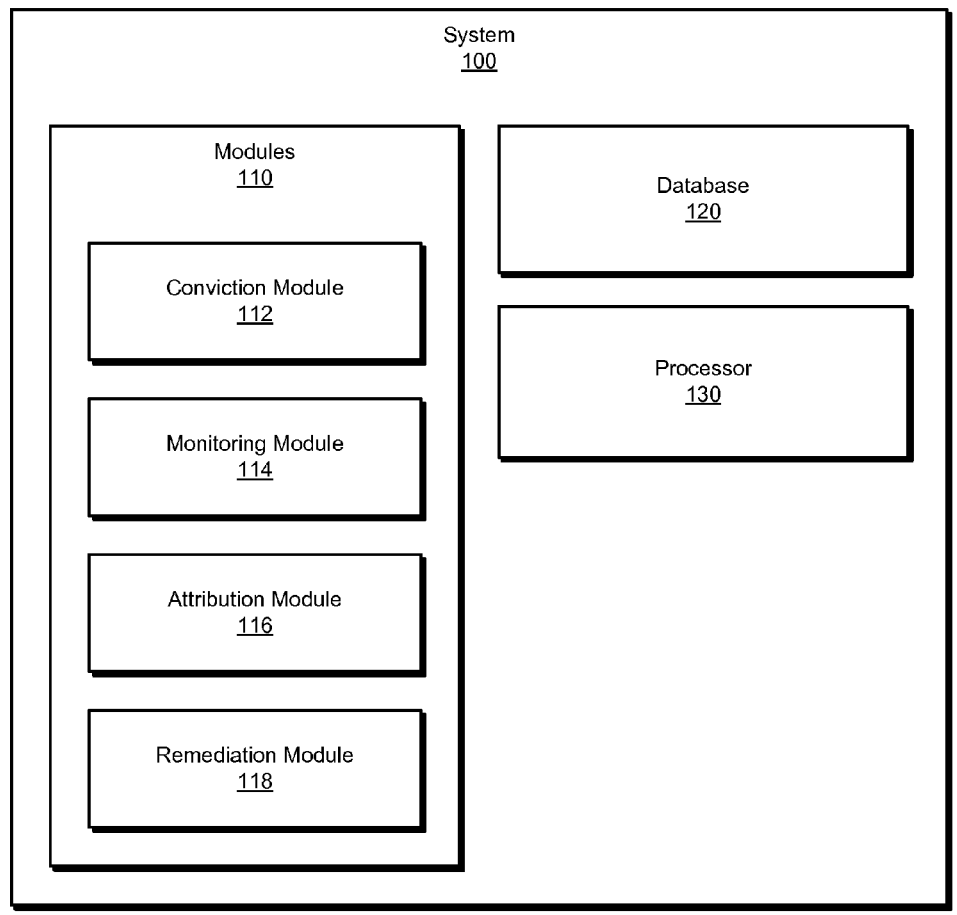
FIG. 1 is a block diagram of an exemplary system for locating malware.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for locating malware. Embodiments of the instant disclosure may enable one or more modules on a computing device to locate malware on the computing device by attributing a malicious behavior on the computing device to an executable object based on when the executable object was added to a set of interrelated executable objects. For example, one or more modules on the computing device may detect a malicious behavior caused by a web browser. In order to determine which component of the web browser harbors the malware causing the malicious behavior, one or more modules may identify a plug-in recently installed in the web browser and may attribute the malicious behavior to the recently-installed plug-in.

Figure 2:
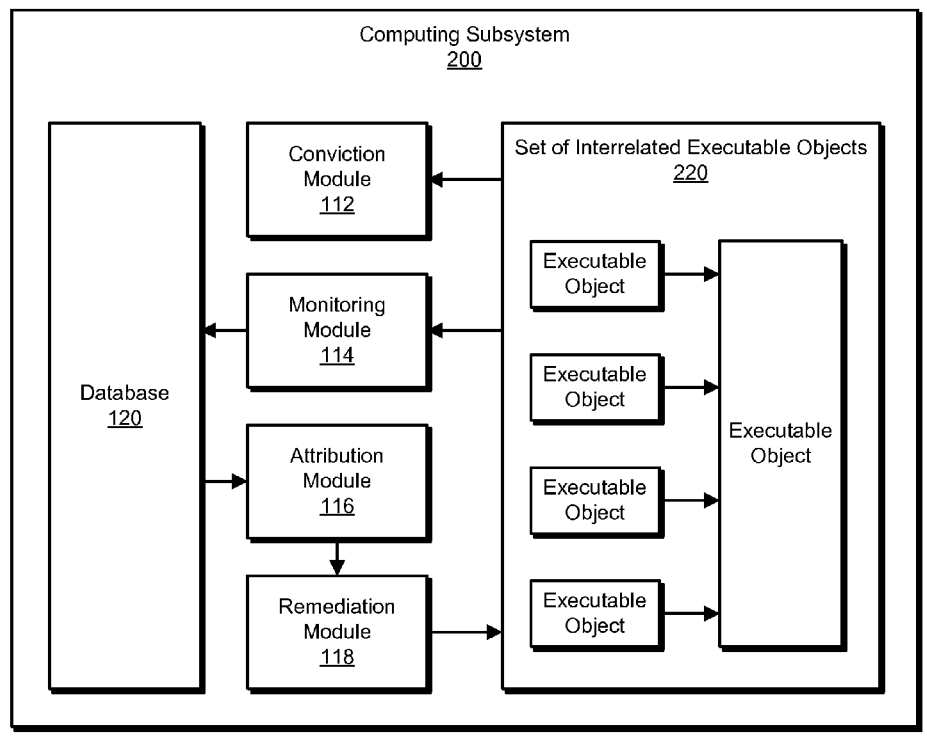
FIG. 2 is a block diagram of an exemplary system for locating malware.

The following will provide, with reference to FIGS. 1-2, detailed descriptions of exemplary systems for locating malware. Detailed descriptions of corresponding computer-implemented methods will also be provided in connection with FIG. 3. Detailed descriptions of an exemplary set of executable objects and a timeline of changes to the exemplary set of executable objects will be provided in connection with FIGS. 4 and 5, respectively. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for locating malware. As illustrated in this figure, exemplary system 100 may include one or more modules 110 for performing one or more tasks. For example, and as will be explained in greater detail below, exemplary system 100 may include a conviction module 112, a monitoring module 114, an attribution module 116, and a remediation module 118. Conviction module 112 may be programmed to identify a malicious behavior in a computing system and determine that the malicious behavior arises from a set of interrelated executable objects, and monitoring module 114 may be programmed to identify an executable object recently added to the set of interrelated executable objects. Attribution module 116 may be programmed to attribute the malicious behavior to the recently added executable object based on when then recently added executable object was added to the set of interrelated executable objects, and remediation module 118 may be programmed to perform a security action on the recently added executable object. Although illustrated as separate elements, one or more of modules 110 in FIG. 1 may represent portions of a single module or application.

In certain embodiments, one or more of modules 110 in FIG. 1 may represent one or more software applications or programs that, when executed by a computing device, may cause the computing device to perform one or more tasks. For example, as will be described in greater detail below, one or more of modules 110 may represent software modules stored and configured to run on one or more computing devices, such as the devices illustrated in FIG. 2 (e.g., computing device 210 and/or server 220), computing system 610 in FIG. 6, and/or portions of exemplary network architecture 700 in FIG. 7. One or more of modules 110 in FIG. 1 may also represent all or portions of one or more special-purpose computers configured to perform one or more tasks.

As illustrated in FIG. 1, exemplary system 100 may also include a database 120. Database 120 may represent portions of a single database or computing device or a plurality of databases or computing devices. In one embodiment, database 120 may store information relating to additions to the set of interrelated executable objects (e.g., the times of such additions).

Database 120 in FIG. 1 may represent a portion of one or more computing devices. For example, database 120 may represent a portion of computing device 210 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as computing device 210 in FIG. 2 computing system 610 in FIG. 6, and/or portions of exemplary network architecture 700 in FIG. 7.

System 100 may also include a processor 130. Processor 130 may include one or more microprocessors or central processing units configured to execute one or more of modules 110. For example, processor 130 may include processor 614 in FIG. 6.

FIG. 2 illustrates an exemplary computing subsystem 200 for locating malware. As illustrated in this figure, exemplary computing subsystem 200 may include conviction module 112, monitoring module 114, attribution module 116, remediation module 118, database 120, and a set of interrelated executable objects 220. Conviction module 112 may identify a malicious behavior arising from set of interrelated executable objects 220. Monitoring module 114 may identify an executable object recently added to the set of interrelated executable objects. In some embodiments, monitoring module 114 may store, in database 120, information related to the addition of the recently added executable object. Attribution module 116 may attribute the malicious behavior to the recently added executable object based on when the recently added executable object was added to the set of interrelated executable objects. In some embodiments, attribution module 116 may use information stored by monitoring module 114 in database 120 to attribute the malicious behavior to the recently added executable object. Once attribution module 116 attributes the malicious behavior to the recently added executable object, remediation module 118 may perform a security action on the recently added executable object (e.g., removing the recently added executable object from the set of interrelated executable objects 220).

Computing subsystem 200 generally represents any type or form of computing device capable of reading computer-executable instructions. Examples of computing subsystem 200 include, without limitation, laptops, desktops, servers, cellular phones, personal digital assistants (PDAs), multimedia players, embedded systems, combinations of one or more of the same, exemplary computing system 610 in FIG. 6, one or more components of network architecture 700, and/or any other suitable computing device.

Figure 3:
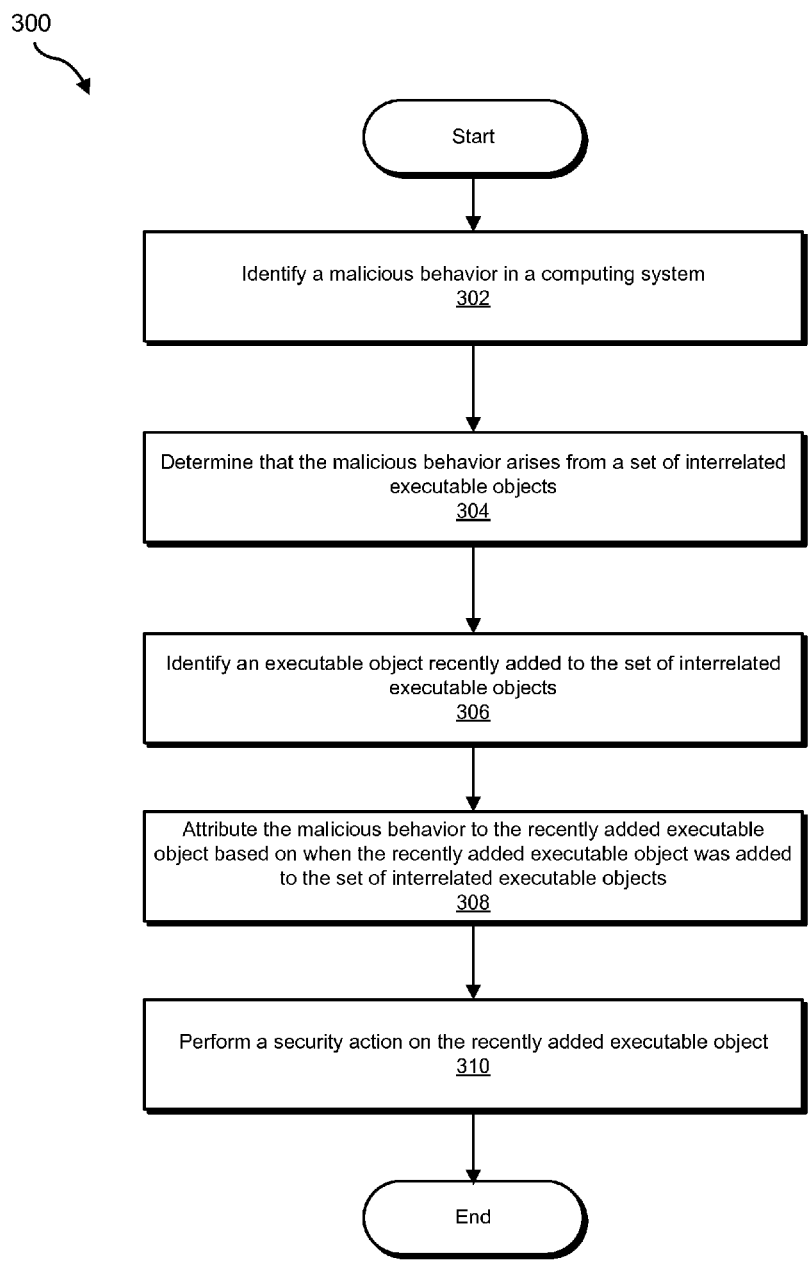
FIG. 3 is a flow diagram of an exemplary method for locating malware.

FIG. 3 illustrates an exemplary computer-implemented method 300 that may locating malware using one or more of the elements shown in FIGS. 1 and 2. The steps in FIG. 3 may be performed by any suitable computer executable code and/or hardware. As illustrated in this figure, at step 302 conviction module 112 may identify a malicious behavior in a computing system. For example, conviction module 112 may identify the malicious behavior through behavioral analysis techniques and/or may be informed of the malicious behavior by security software that detected the malicious behavior.

The malicious behavior identified by conviction module 112 may include any behavior that is undesirable in a computing system and/or any behavior that is attributable to malware or other software capable of compromising the security, stability, and/or performance of a computing system. For example, the malicious behavior may include a communication with an untrusted member of a network, such as a malicious server accessible on the internet. The malicious behavior may also include the creation of a malicious file or the addition of malicious content to an otherwise legitimate file. In some cases, the malicious behavior may include an injection of executable code into a process. Generally, the malicious behavior may include any behavior that may trigger an intrusion prevention signature in security software (i.e., any behavior held suspect by security software).

Returning to FIG. 3, at step 304 conviction module 112 may determine that the malicious behavior arises from a set of interrelated executable objects. An executable object may include any file that includes executable code or instructions that may result in executable code when interpreted. For example, an executable object may include an executable program (such as a web browser, a word processor, or a start-up program), a dynamically linked library (DLL), a plug-in (such as a WINDOWS INTERNET EXPLORER browser helper object), an extension (such as a WINLOGON extension) a module, a service, and/or a driver.

The set of interrelated executable objects may include any set of executable objects to which the malicious behavior may be generally attributed. For example, the set of interrelated executable objects may include an executable program and executable modules used by the executable program (such as a web browser along with the DLLs and plug-ins that the web browser uses). In some embodiments, the set of interrelated executable objects may include a set of executable objects that load into a single process. More generally, the set of interrelated executable objects may include any behaviorally opaque set of executable objects. In other words, the set of interrelated executable objects may include any set of executable objects to which a malicious behavior may be traced, but which tends to obscure which member of the group is ultimately responsible for the malicious behavior. For example, if the conviction module determines that a malicious behavior arose from in the process of loading start-up applications (e.g., programs in the Run key of a WINDOWS registry), the set of interrelated executable objects may include the set of start-up programs on the computing system. If, in another example, the conviction module determines that the malicious behavior arose from a kernel-mode program, the set of interrelated executable objects may include the set of device drivers running on the computing system. In some embodiments, the set of interrelated executable objects may include all executable objects on the computing system.

Conviction module 112 may determine that the malicious behavior arose from the set of interrelated executable objects in any suitable manner. For example, conviction module 112 may receive an indication from security software that the malicious behavior arose from the set of interrelated executable objects. Additionally or alternatively, conviction module 112 may determine that the malicious behavior arose from the set of interrelated executable objects by determining that the malicious behavior arose from a process that was loaded from the set of interrelated executable objects. In general, conviction module 112 may determine that the malicious behavior arose from the set of interrelated executable objects through any factors and/or circumstances that give rise to an inference that at least one of the executable objects in the set of interrelated executable objects contains or consists of malware.

Returning to FIG. 3, at step 306 monitoring module 114 may identify an executable object recently added to the set of interrelated executable objects. Monitoring module 114 may identify the executable object recently added to the set of interrelated executable objects in a variety of ways. For example, monitoring module 114 may monitor the computing system for an addition of the recently added executable object to a load point of the set of interrelated executable objects.

A load point may include any location and/or context where an executable object may be added to a set of interrelated executable objects. For example, the load point of the set of start-up programs on a computing system may include the Run key in a WINDOWS registry. In another example, the load point of a web browser and its components may include a plug-in directory.

When monitoring module 114 detects the addition of the recently added executable object to the load point, monitoring module 114 may, in some embodiments, create an entry in a database (such as database 120) indicating that the recently added executable object was added to the set of interrelated executable objects. The entry in the database may include any information useful for locating malware based on when an executable object was added to a set of interrelated executable objects. For example, the entry in the database may include the identity of the recently added executable object, the load point where the recently added executable object was added, and/or the time when the recently added executable object was added.

As an addition or alternative to the embodiments and examples provided above, monitoring module 114 may identify the executable object recently added to the set of interrelated executable objects by receiving the identity of the recently added executable object from security software or conviction module 112. In some embodiments, monitoring module 114 may identify the recently added executable object by reading from an entry in a database, such as database 120, that had previously recorded the addition of the recently added executable object. In other embodiments, monitoring module 114 may identify the recently added executable object simply by accessing a file name or path for the recently added executable object.

As used herein, an executable object being "recently added" may refer to the executable object being recently installed. In some further embodiments, "recently added" may also refer to the executable object being recently updated and/or upgraded, or recently changed and/or reconfigured in some other manner. In other embodiments, "recently added" may refer to the executable object being recently loaded into memory. As will be described in further detail below, "recent" in this context may speak to time (i.e., how much time has passed since the executable object was added) or order (i.e., how many other executable objects have since been added since the executable object was added).

Returning to FIG. 3, at step 308 attribution module 116 may attribute the malicious behavior to the recently added executable object based on when the recently added executable object was added to the set of interrelated executable objects. Attribution module 116 may attribute the malicious behavior to the recently added executable object using one or more of a variety of methods. For example, attribution module 116 may attribute the malicious behavior to the recently added executable object by determining that the recently added executable object was added to the set of interrelated executable objects within a predetermined window of time. In some embodiments, the predetermined window of time may extend backward from the time that the malicious behavior first arose. For example, attribution module 116 may attribute the malicious behavior to a browser plug-in if the browser plug-in was installed within 24 hours before the malicious behavior first arose. In some embodiments, the predetermined window of time may only measure time during which the set of interrelated executable objects were loaded and running. For example, attribution module 116 may attribute the malicious behavior to a browser plug-in if the browser had only been loaded and running for less than 24 hours between the time that the browser plug-in was installed and the time that the malicious behavior arose.

In certain embodiments, attribution module 116 may attribute the malicious behavior to a recently added executable object by determining that the recently added executable object was one of the most recent executable objects to be added to the set of interrelated executable objects. For example, attribution module 116 may attribute the malicious behavior to a browser plug-in if the plug-in was one of the last three plug-ins installed. In some embodiments, attribution module 116 may attribute the malicious behavior to the single most recent executable object added to the set of executable objects. In certain embodiments, attribution module 116 may determine whether the recently added executable object was one of the most recent executable objects to be added to the set of interrelated executable objects before the malicious behavior arose. For example, attribution module 116 may attribute the malicious behavior to a browser plug-in if the plug-in was one of the last three plug-ins installed before the malicious behavior arose.

Attribution module 116 may also attribute the malicious behavior to the recently added executable object by some combination of the above-described factors. For example, attribution module 116 may attribute the malicious behavior to the recently added executable object by determining both that the recently added executable object was one of the most recent executable objects added to the set of interrelated executable objects and that the recently added executable object was added to the set of interrelated executable objects within a predetermined window of time before the malicious behavior arose.

In some embodiments, attribution module 116 may create or contribute to an attribution score for the recently added executable object based on the proximity in time of the addition of the recently added executable object to the malicious behavior and/or the order in which the recently added executable object was added to the set of interrelated executable objects. The attribution score may also include other factors tending to indicate the likelihood of the recently added executable object containing malware. Attribution module 116 may then attribute the malicious behavior to the recently added executable object based on the attribution score.

Returning to FIG. 3, at step 310 remediation module 118 may perform a security action on the recently added executable object. For example, remediation module 118 may remove and/or uninstall the recently added executable object. Additionally or alternatively, remediation module 118 may reverse changes made when the recently added executable object joined the set of interrelated executable objects. This may include reversing changes to configuration files and/or uninstalling additional files that the recently added executable object installed.

In some embodiments, which security action remediation module 118 performs may depend on an attribution score of the recently added executable object. For example, if the attribution score indicates a high probability that the malicious behavior arose from the recently added executable object, remediation module 118 may act more aggressively to reverse changes caused by the recently added executable object.

Figure 4:
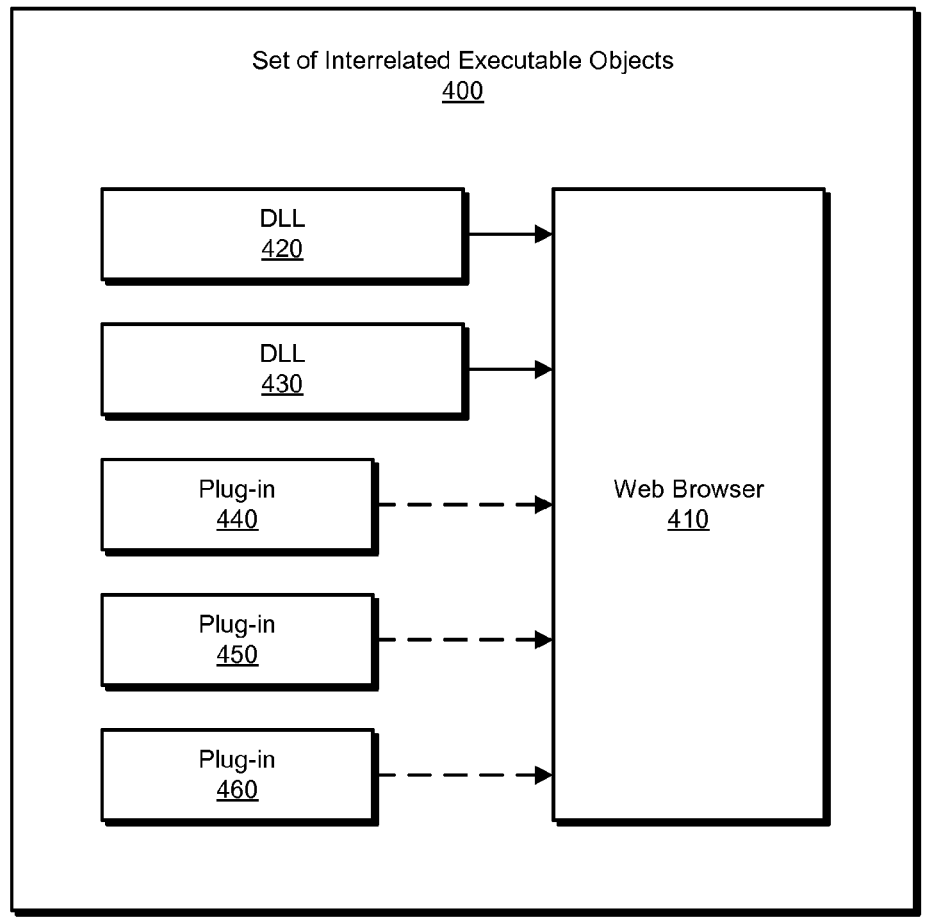
FIG. 4 is an illustration of an exemplary set of interrelated executable objects.
Figure 5:
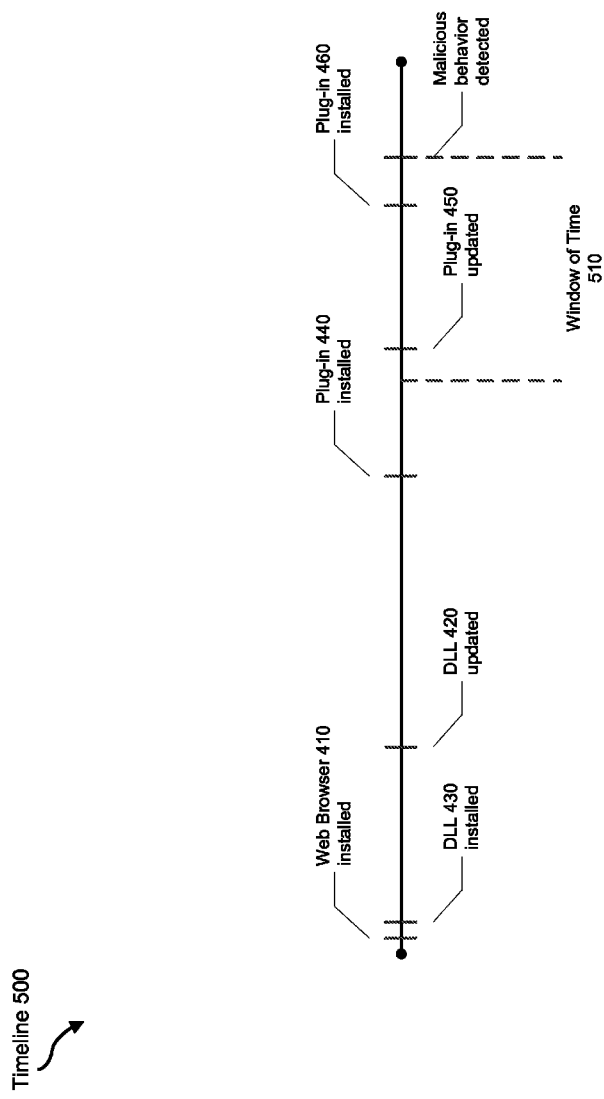
FIG. 5 is an illustration of an exemplary timeline of additions to the set of interrelated executable objects.

For the sake of clarity, and by way of example only, FIG. 4 illustrates an exemplary set of interrelated executable objects 400, and FIG. 5 illustrates an exemplary timeline 500 of additions to the set of interrelated executable objects 400. The set of interrelated executable objects 400 may include a web browser 410, DLLs 420 and 430, and plug-ins 440, 450, and 460. Web browser 410 may run as a single process with DLLs 420 and 430 and plug-ins 440, 450, and 460.

Timeline 500 illustrates times when web browser 410, DLLs 420 and 430, and plug-ins 440, 450, and 460, were installed or updated. This information may have been collected by monitoring module 114 and stored in database 120. Window of time 510 shows a predetermined window of time extending backward from when the malicious behavior was detected by conviction module 112. Both plug-in 450 and plug-in 460 may have been added to the set of interrelated executable objects 400 within window of time 510. Accordingly, attribution module 116 may attribute the malicious behavior to both plug-in 450 and plug-in 460. Remediation module 118 may then uninstall plug-ins 450 and 460. In embodiments where attribution module 116 only attributes malicious behavior to the most recently added executable object, attribution module 116 may determine that plug-in 460 was the most recently added executable object to fall within window of time 510. Attribution module 116 would then attribute the malicious behavior only to plug-in 460.

Embodiments of the instant disclosure may provide various features and advantages not provided by traditional malware detection technologies. For example, a traditional malware detection heuristic may be able to attribute a malicious behavior to a process generally, but may not correctly identify what component of the process contains the malware that caused the malicious behavior. Embodiments of the instant disclosure may be able to correctly identify which component of a process contains malware. This may allow for more effective protection of a computing system without unnecessary disruption caused by false positives.

One or more of the steps of the method for locating malware described above may transform a computing system by changing the state of the computing system. For example, the method for locating malware may transform a computing system with malware into a computing system without malware.

Figure 6:
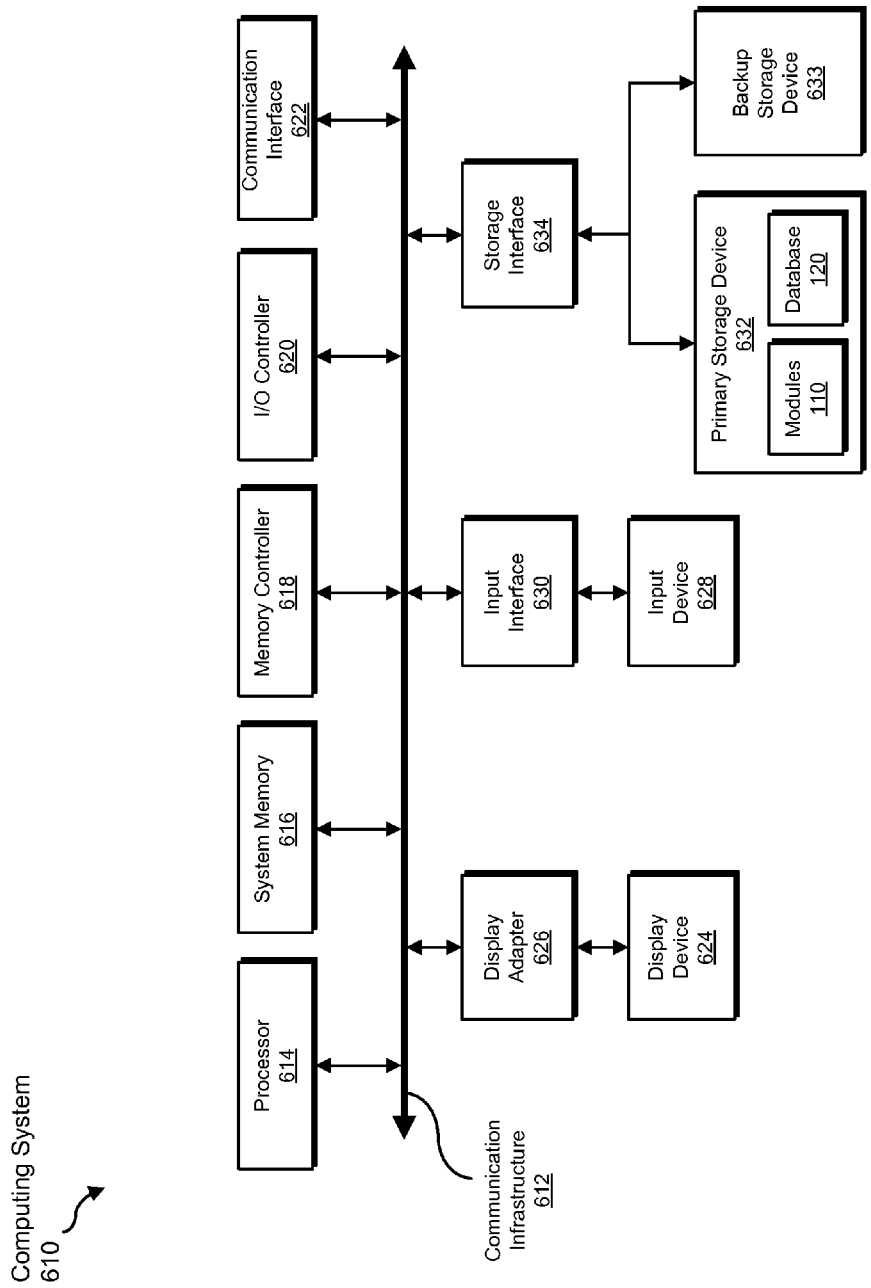
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may comprise at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, determining, attributing, performing, monitoring, creating, removing, and/or reversing steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may comprise both a volatile memory unit (such as, for example, system memory 616) and a non-volatile storage device (such as, for example, primary storage device 632, as described in detail below).

In certain embodiments, exemplary computing system 610 may also comprise one or more components or elements in addition to processor 614 and system memory 616. For example, as illustrated in FIG. 6, computing system 610 may comprise a memory controller 618, an Input/Output (I/O)

controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller may perform and/or be a means for performing, either alone or in combination with other elements, one or more of the steps or features described and/or illustrated herein, such as identifying, determining, attributing, performing, monitoring, creating, removing, and/or reversing.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the identifying, determining, attributing, performing, monitoring, creating, removing, and/or reversing steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network comprising additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 694 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, determining, attributing, performing, monitoring, creating, removing, and/or reversing steps disclosed herein. Communication interface 622 may also be used to perform and/or be a means for performing other steps and features set forth in the instant disclosure.

As illustrated in FIG. 6, computing system 610 may also comprise at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also comprise at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, determining, attributing, performing, monitoring, creating, removing, and/or reversing steps disclosed herein. Input device 628 may also be used to perform and/or be a means for performing other steps and features set forth in the instant disclosure.

As illustrated in FIG. 6, exemplary computing system 610 may also comprise a primary storage device 632 and a backup storage device 633 coupled to communication infrastructure 612 via a storage interface 634. As shown, storage device 1132 may include one or more of modules 110 for performing embodiments of the present disclosure. Similarly, storage device 1132 may include database 120. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also comprise other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the identifying, determining, attributing, performing, monitoring, creating, removing, and/or reversing steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
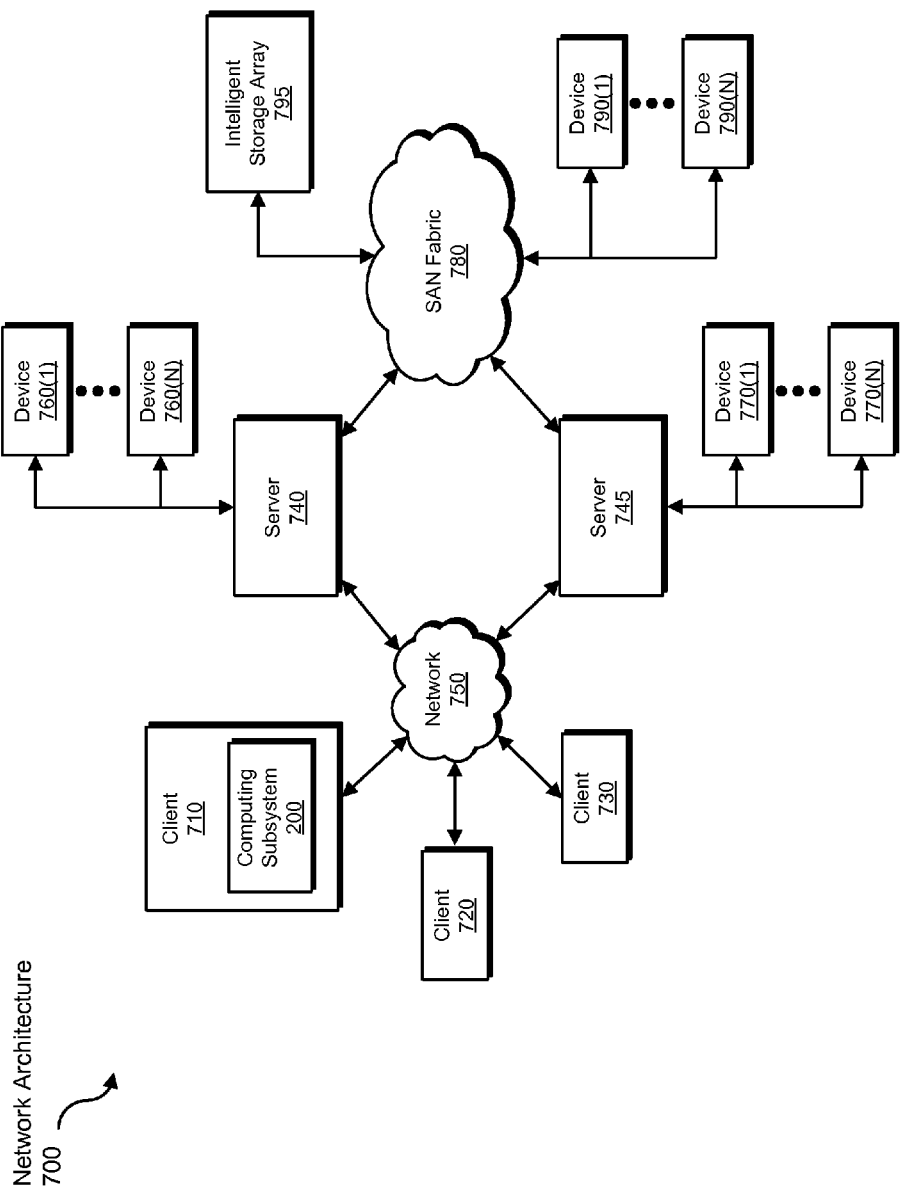
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As shown, client system 1210 may include computing subsystem 200. One or more components of computing subsystem 200 may also be included in various other elements of network architecture 700. Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the identifying, determining, attributing, performing, monitoring, creating, removing, and/or reversing steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for locating malware. For example, a computing system (e.g., computing system 610 and/or one or more of the components of network architecture 700) may perform a computer-implemented method for locating malware. The computing system may identify a malicious behavior in the computing system. The computing system may determine that the malicious behavior arises from a set of interrelated executable objects. The computing system may identify an executable object recently added to the set of interrelated executable objects. The computing system may attribute the malicious behavior to the recently added executable object based on when the recently added executable object was added to the set of interrelated executable objects. The computing system may then perform a security action on the recently added executable object.

In some embodiments, attributing the malicious behavior to the recently added executable object based on when the recently added executable object was added may include determining that the recently added executable object was added to the set of interrelated executable objects within a predetermined window of time. In various embodiments, attributing the malicious behavior to the recently added executable object based on when the recently added executable object was added may include determining that the recently added executable object was one of the most recent executable objects to be added to the set of interrelated executable objects. In certain embodiments, determining that the recently added executable object was one of the most recent executable objects added may include determining that the recently added executable object was the most recent executable object to be added to the set of interrelated executable objects. According to some embodiments, determining that the recently added executable object was one of the most recent executable objects added may include determining that the recently added executable object was the most recent executable object to be added to the set of interrelated executable objects. By some embodiments, attributing the malicious behavior to the recently added executable object based on when the recently added executable object was added may include (1) determining that the recently added executable object was one of the most recent executable objects added to the set of interrelated executable objects; and (2) determining that the recently added executable object was added to the set of interrelated executable objects within a predetermined window of time before the malicious behavior arose.

In various embodiments, the recently added executable object may include at least one of: a plug-in, a dynamically linked library, a service, a driver, or a start-up program. In some embodiments, the set of interrelated executable objects may include an executable program and executable modules used by the executable program. In certain embodiments, the set of interrelated executable objects may run as a single process.

According to some embodiments, identifying the recently added executable object in the set of interrelated executable objects may include monitoring the computing system for an addition of the recently added executable object to a load point of the set of interrelated executable objects. In some further embodiments, identifying the recently added executable object may further include creating an entry in a database indicating that the recently added executable object was added to the set of interrelated executable objects. In various further embodiments, the entry in the database may include at least one of (1) an identity of the recently added executable object, (2) the load point where the recently added executable object was added, and (3) a time when the recently added executable object was added to the set of interrelated executable objects.

In some embodiments, the security action comprises at least one of (1) removing the recently added executable object, and (2) reversing changes made when the recently added executable object joined the set of interrelated executable objects. According to some embodiments, the malicious behavior comprises at least one of (1) triggering an intrusion prevention signature, (2) injecting executable code into another process, (3) creating a malicious file, and/or (4) communicating with an untrusted member of a network.

Embodiments of the instant disclosure may be implemented in cloud computing environments. Cloud computing environments may provide various services and applications via the internet. These cloud-based services (e.g., software as a service, platform as a service, infrastructure as a service, etc.) may be accessible through a web browser or other remote interface. For example, the functionality of one or more of modules 110 may be provided through a cloud computing environment. Thus, the methods and systems for locating malware described herein may be provided through a remote desktop environment or any other cloud-based computing environment. For example, one or more of modules 110 may execute remote from a monitored computing system (i.e., a computing system monitored for malware) in a cloud-based computing environment and/or any other remote computing environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for locating malware, at least a portion of the method being performed by a computing device comprising at least one processor, the method comprising:
   identifying a malicious behavior in a computing system;
   determining that the malicious behavior arises from a set of interrelated executable objects that is behaviorally opaque such that the set of interrelated executable objects obscures which executable object in the set is responsible for the malicious behavior, wherein the set of interrelated executable objects comprises an executable program and each executable object within the set of interrelated executable objects comprises an executable module used by the executable program such that the set of interrelated executable objects runs as a single process where each executable object in the set of interrelated executable objects is a component of the single process that loads into the single process;
   identifying an executable object recently added to the set of interrelated executable objects;
   attributing the malicious behavior to the recently added executable object based on when the recently added executable object was added to the set of interrelated executable objects;
   performing a security action on the recently added executable object.

2. The computer-implemented method of claim 1, wherein attributing the malicious behavior to the recently added executable object based on when the recently added executable object was added comprises determining that the recently added executable object was added to the set of interrelated executable objects within a predetermined window of time.

3. The computer-implemented method of claim 1, wherein attributing the malicious behavior to the recently added executable object based on when the recently added executable object was added comprises determining that the recently added executable object was one of the most recent executable objects to be added to the set of interrelated executable objects.

4. The computer-implemented method of claim 3, wherein determining that the recently added executable object was one of the most recent executable objects added comprises determining that the recently added executable object was the most recent executable object to be added to the set of interrelated executable objects.

5. The computer-implemented method of claim 1, wherein attributing the malicious behavior to the recently added executable object comprises determining that the recently added executable object was one of the most recent executable objects added before the malicious behavior arose.

6. The computer-implemented method of claim 1, wherein attributing the malicious behavior to the recently added executable object based on when the recently added executable object was added comprises:
   determining that the recently added executable object was one of the most recent executable objects added to the set of interrelated executable objects;
   determining that the recently added executable object was added to the set of interrelated executable objects within a predetermined window of time before the malicious behavior arose.

7. The computer-implemented method of claim 1, wherein the recently added executable object comprises at least one of:
   a plug-in;
   a dynamically linked library;
   a driver.

8. The computer-implemented method of claim 1, wherein identifying the recently added executable object in the set of interrelated executable objects comprises monitoring the computing system for an addition of the recently added executable object to a load point of the set of interrelated executable objects.

9. The computer-implemented method of claim 8, wherein identifying the recently added executable object further comprises creating an entry in a database indicating that the recently added executable object was added to the set of interrelated executable objects.

10. The computer-implemented method of claim 9, wherein the entry in the database comprises at least one of:
    an identity of the recently added executable object;
    the load point where the recently added executable object was added.

11. The computer-implemented method of claim 1, wherein the security action comprises at least one of:
    removing the recently added executable object;
    reversing changes made when the recently added executable object joined the set of interrelated executable objects.

12. The computer-implemented method of claim 1, further comprising determining that the malicious behavior arose in the process of loading start-up applications, wherein the recently added executable object comprises a start-up program.

13. The computer-implemented method of claim 1, wherein identifying the executable object recently added to the set of interrelated executable objects comprises identifying an executable object within the set of interrelated executable objects that was recently modified.

14. A system for locating malware based on recent additions of executable objects, the system comprising:
    a conviction software module programmed to:
       identify a malicious behavior in a computing system;
       determine that the malicious behavior arises from a set of interrelated executable objects;
    a monitoring software module programmed to:
       identify an executable object recently added to the set of interrelated executable objects that is behaviorally opaque such that the set of interrelated executable objects obscures which executable object in the set is responsible for the malicious behavior, wherein the set of interrelated executable objects comprises an executable program and each executable object within the set of interrelated executable objects comprises an executable module used by the executable program such that the set of interrelated executable objects runs as a single process where each executable object in the set of interrelated executable objects is a component of the single process that loads into the single process;
    an attribution software module programmed to:
       attribute the malicious behavior to the recently added executable object based on when the recently added executable object was added to the set of interrelated executable objects;
    a remediation software module programmed to:
       perform a security action on the recently added executable object;

one or more hardware processors configured to execute the conviction, monitoring, attribution, and remediation software modules.

15. The system of claim 14, wherein:
the monitoring software module is programmed to identify the recently added executable object by monitoring a run key in a WINDOWS registry;
the recently added executable object comprises a startup program.

16. The system of claim 14, wherein:
the monitoring software module is programmed to identify the recently added executable object by monitoring a plug-in directory of a web browser;
the recently added executable object comprises a plug-in that was recently added to the plug-in directory.

17. The system of claim 14, wherein the attribution software module is programmed to attribute the malicious behavior to the recently added executable object based on when the recently added executable object was added by:
determining that the recently added executable object was one of the most recent executable objects added to the set of interrelated executable objects;
determining that the recently added executable object was added to the set of interrelated executable objects within a predetermined window of time before the malicious behavior arose.

18. A non-transitory computer-readable-storage medium comprising one or more computer-executable instructions that, when executed by a computing device, cause the computing device to:
identify a malicious behavior in a computing system;
determine that the malicious behavior arises from a set of interrelated executable objects that is behaviorally opaque such that the set of interrelated executable objects obscures which executable object in the set is responsible for the malicious behavior, wherein the set of interrelated executable objects comprises an executable program and each executable object within the set of interrelated executable objects comprises an executable module used by the executable program such that the set of interrelated executable objects runs as a single process where each executable object in the set of interrelated executable objects is a component of the single process that loads into the single process;
identify an executable object recently added to the set of interrelated executable objects;
attribute the malicious behavior to the recently added executable object based on when the recently added executable object was added to the set of interrelated executable objects;
perform a security action on the recently added executable object.

* * * * *